(12) United States Patent
Hajjar

(10) Patent No.: US 8,830,577 B2
(45) Date of Patent: Sep. 9, 2014

(54) ROLLABLE DISPLAY SCREEN

(75) Inventor: Roger A. Hajjar, San Jose, CA (US)

(73) Assignee: Prysm, Inc., San Jose, CA (US)

( * ) Notice: Subject to any disclaimer, the term of this patent is extended or adjusted under 35 U.S.C. 154(b) by 33 days.

(21) Appl. No.: 13/470,051

(22) Filed: May 11, 2012

(65) Prior Publication Data

US 2012/0287502 A1    Nov. 15, 2012

Related U.S. Application Data

(60) Provisional application No. 61/485,520, filed on May 12, 2011.

(51) Int. Cl.
*G03B 21/56* (2006.01)
*G03B 21/26* (2006.01)
*G03B 21/14* (2006.01)

(52) U.S. Cl.
USPC ............. 359/461; 353/29; 353/79; 345/84

(58) Field of Classification Search
USPC ............. 359/461, 443; 353/29, 79; 345/84
See application file for complete search history.

(56) References Cited

U.S. PATENT DOCUMENTS

| 4,439,027 | A  | * | 3/1984  | Shioda et al. ............. 353/77 |
| 4,773,731 | A  | * | 9/1988  | Goldenberg et al. ........ 359/457 |
| 5,337,179 | A  | * | 8/1994  | Hodges ..................... 359/443 |
| 6,873,460 | B1 | * | 3/2005  | Burstyn et al. ............. 359/461 |
| 2002/0024495 | A1 | * | 2/2002 | Lippert et al. .............. 345/98 |
| 2004/0001254 | A1 | * | 1/2004 | Shimizu ..................... 359/449 |
| 2004/0257652 | A1 | * | 12/2004 | Peterson et al. ............ 359/460 |
| 2007/0228927 | A1 | * | 10/2007 | Kindler et al. ............. 313/495 |

* cited by examiner

*Primary Examiner* — Christopher Mahoney
(74) *Attorney, Agent, or Firm* — Patterson & Sheridan, LLP

(57) ABSTRACT

A rollable display screen for use in electronic display systems includes a rollable screen that is mechanically coupled to a roller mechanism and has a plurality of pixel elements disposed thereon. The roller mechanism is configured as a stowing mechanism for the rollable screen, and may be further configured to deploy the rollable screen as a substantially planar viewing surface. The rollable display screen can be advantageously used for a durable and easily transported electronic display device since the rollable display screen is light-weight, durable, and compact.

19 Claims, 10 Drawing Sheets

ROLLABLE DISPLAY SCREEN

CROSS-REFERENCE TO RELATED APPLICATION

The present application claims priority to U.S. Provisional Patent Application No. 61/485,520, filed on May 12, 2011, which is incorporated herein by reference in its entirety.

BACKGROUND OF THE INVENTION

1. Field of the Invention

Embodiments of the present invention relate generally to display devices and, more specifically, to a rollable display screen for a display device.

2. Description of the Related Art

Electronic display systems are commonly used to display information from computers and other sources. Typical display systems range in size from small displays used in mobile devices to very large displays, such as tiled displays, that are used to display images to thousands of viewers at one time. Display screens for such display systems are typically bulky and fragile, and are consequently difficult to transport. Accordingly, there is a need in the art for a lightweight and portable display screen suitable for use in electronic display systems.

SUMMARY OF THE INVENTION

One embodiment of the present invention sets forth a rollable display screen suitable for use in electronic display systems. The rollable display screen includes a rollable screen that is mechanically coupled to a roller mechanism and has a plurality of pixel elements disposed thereon. The roller mechanism is configured as a stowing mechanism for the rollable screen, and may be further configured to deploy the rollable screen as a substantially planar viewing surface. The rollable display screen can be advantageously used for a durable and easily transported electronic display device since the rollable display screen is light-weight, durable, and compact.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
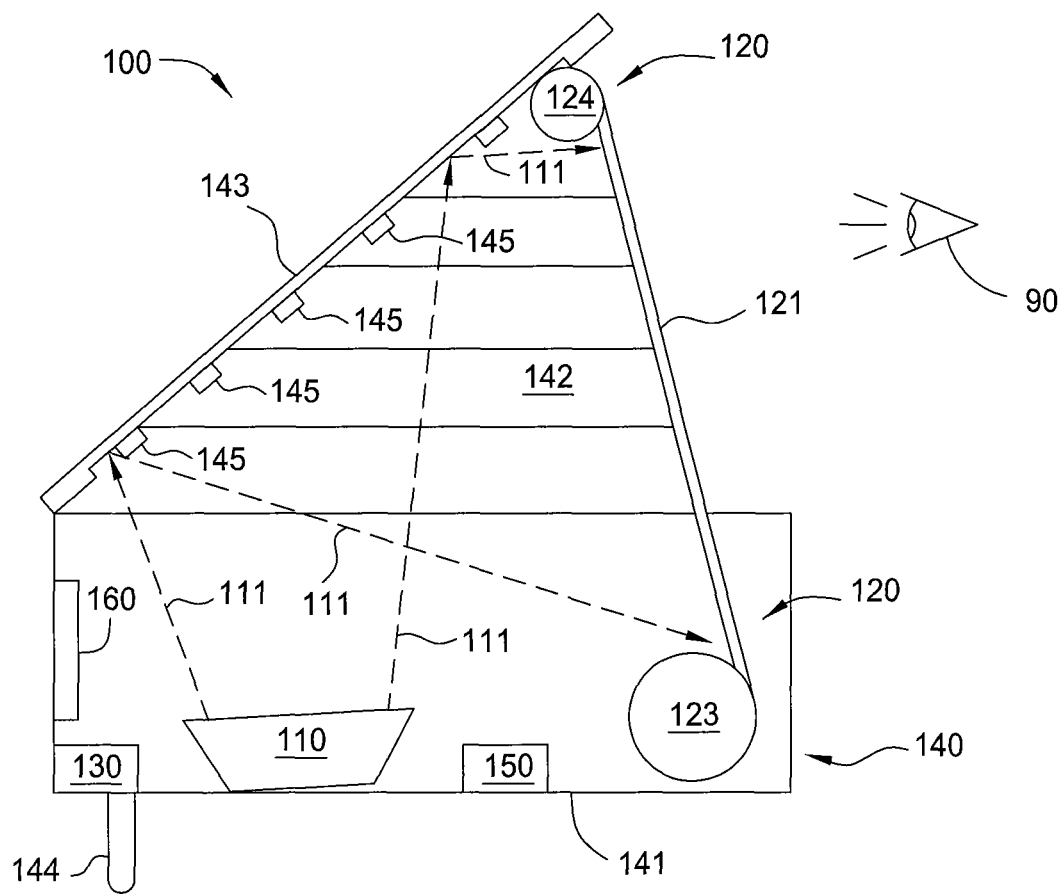
FIG. 1 is a schematic side view of a portable display device, according to an embodiment of the invention.

FIG. 1 is a schematic side view of a portable display device 100, according to an embodiment of the invention. Portable display device 100 is a compact, light-weight, self-powered apparatus configured to display near-viewing-resolution still and video images that are viewable in a brightly lit outdoor environment. Because portable display device 100 can operate for extended periods without an external power source, portable display device 100 is truly portable, and not simply easily transported. In FIG. 1, portable display device 100 is depicted deployed in a viewing configuration, and includes a light module 110, a retractable screen assembly 120, a self-contained power source 130, a collapsible enclosure assembly 140, a control system 150 and speakers 160. In some embodiments, portable display device 100 includes speakers 160, and in other embodiments, external speakers are used to provide sound.

Light module 110 is configured to generate and direct image-generating beams 111 to produce a high-resolution still or video image on display screen 121 for a viewer 90. Image-generating beams 111 include optical pulses that carry image information. In some embodiments, image-generating beams 111 include visible lasers beams of different colors that discretely illuminate individual pixel elements of display 121 to produce the image. In other embodiments, image-generating beams 111 include invisible laser beams, such as near-violet or ultra-violet (UV) laser beams that act as excitation beams to excite phosphors on the screen. In such embodiments, image-generating beams 111 are directed to discrete pixel elements of display screen 121 that are made up of light-emitting material that absorbs optical energy from image-generating beams 111 to emit visible light and produce an image. It is also understood that portable display device 100 may be comprised of hybrid visible and invisible lasers. An example could be the use of a blue laser to generate blue color and the same blue laser could be used to excite red and green phosphors. Alternatively, a UV laser may be used to excite green phosphor and a red and blue laser may be used to make red and blue color directly on the screen. In some embodiments, light module 110 is also configured to generate and direct one or more servo laser beams and includes a detector configured to detect servo feedback light produced by the servo laser beam. In such embodiments, the detector generates feedback data for the position of the image-generating beams 111 with respect to display screen 121, so that image-generating beams 111 can be precisely positioned and optical pulses of the image-generating beams 111 precisely timed to produce an error-free high-resolution image. Different embodiments of light module 110 and display screen 121 are described in greater detail below.

Retractable screen assembly 120 includes display screen 121 and is configured to conveniently deploy display screen 121 in a way that does not unduly stress, fatigue, or crease display screen 121. In the embodiment illustrated in FIG. 1, retractable screen assembly 120 includes a roller mechanism 122 that is mechanically coupled to an edge of display screen 121 and is configured to retract and compactly stow display screen 121 when not in use. Roller mechanism 122 prevents any folding or creasing of display screen 121 and ensures that display screen 121 is correctly positioned when deployed to receive image-generating beams 111. Roller mechanism 122 includes a first roller 123 and, in some embodiments, a second roller 124. Roller mechanism 122 can also be used to maintain a desired tension in display screen 121, so that the flexible material of display screen 121 provides a substantially planar viewing surface and therefore a higher quality image for viewer 90. It is noted that the use of roller mechanism 122 is enabled by the fact that display screen 121 can be a flexible, rollable material, as opposed to a more traditional rigid screen. Self-contained power source 130 is configured to provide power to portable display device 100 to generate high-brightness still or video images on display screen 121 for extended periods without the need for an external power source. Self-contained power source 130 may be a lithium-ion battery, a lithium-polymer battery, or any other technically feasible lightweight battery having a relatively high power density. Because the power requirements of light module 110, as described herein, are relatively low with respect to prior art approaches for generating an image, portable display device 100 can operate from self-contained power source 130 for long periods, e.g., on the order of eight or ten hours, even when self-contained power source 130 is a battery weighing as little as three or four pounds.

Collapsible enclosure assembly 140 houses light module 110, retractable screen assembly 120, battery 130, and control system 150, and is configured to optically seal portable display device 100 during use and serve as a compact carrying case when portable display device is stowed for storage or transport. Collapsible enclosure assembly 140 includes a base 141, retractable side shades 142, and a top panel 143. Base 141 makes up the main compartment of collapsible enclosure 140 and serves as the base on which portable display device rests when display screen 121 is deployed for viewing. Retractable side shades 142 are configured to optically seal portable display device 100 during use, so that no portion of image-generating beams 111 can leak from collapsible enclosure assembly 140. Retractable side shades 142 may be accordion-style or solid retractable shades, and are configured to be attached to top panel 143 and display screen 121 when display screen 121 is deployed. When display screen 121 is stowed for storage or transport, retractable sides shades are configured to be collapsed into base 141. Top panel 143 is a hinging panel that has an internal mirror for directing image-generating beams 111 from light module 110 to display screen 121 and is configured to support retractable screen assembly 120 when deployed for viewing. In addition, top panel 143 serves as a lid for collapsible enclosure assembly 140 when portable display device is stowed for transport or storage.

Collapsible enclosure assembly 140 has a foldable configuration that extends the optical path between light module 110 and display screen 121 when top panel 143 is opened for use and attached to retractable screen assembly 120, but also makes portable display device 100 compact during transportation. By extending the optical path between light module 110 and display screen 121, the foldable configuration of collapsible enclosure assembly 140 provides an optimum throw distance for the optics directing image-generating beams 111 to display screen 121. This is unlike conventional projection display devices, which may have a foldable encasing to extend the focusing of an image on a display screen. In contrast, the foldable configuration of collapsible enclosure assembly 140, according to embodiments of the invention, extends the focus of each of the individual image-generating beams 111, which carry image information, but not the image itself. Thus, the foldable configuration of collapsible enclosure assembly 140 extends the optical path of image-generating beams 111 to an optimum throw distance onto display screen 121, thereby preventing said beams from being either too big, and illuminating more than one pixel elements at one time, or too small, and illuminating only a fraction of a pixel element.

In some embodiments, collapsible enclosure assembly 140 also includes one or more leveling feet 144, which can be deployed to adjust base 141 out of the horizontal plane in order to position display screen 121 substantially perpendicular to the horizontal plane when display screen 121 is deployed. Leveling feet 144 may be of fixed length. Alternatively, leveling feet may be adjustable in height, for fine-tuning of the orientation of display screen 121 and for stabilization of portable display device 100 on uneven surfaces.

In some embodiments, collapsible enclosure assembly 140 includes optical seal detectors 145, which are configured to detect when collapsible enclosure assembly 140 is optically sealed. In one embodiment, one optical seal detector is disposed at each connection point for retractable side shades 142. In another embodiment, fewer optical seal detectors are used. In some embodiments, optical seal detectors 145 include a mechanical switch, while in other embodiments, optical seal detectors 145 include at least one light detector disposed inside collapsible enclosure assembly 140.

Figure 2:
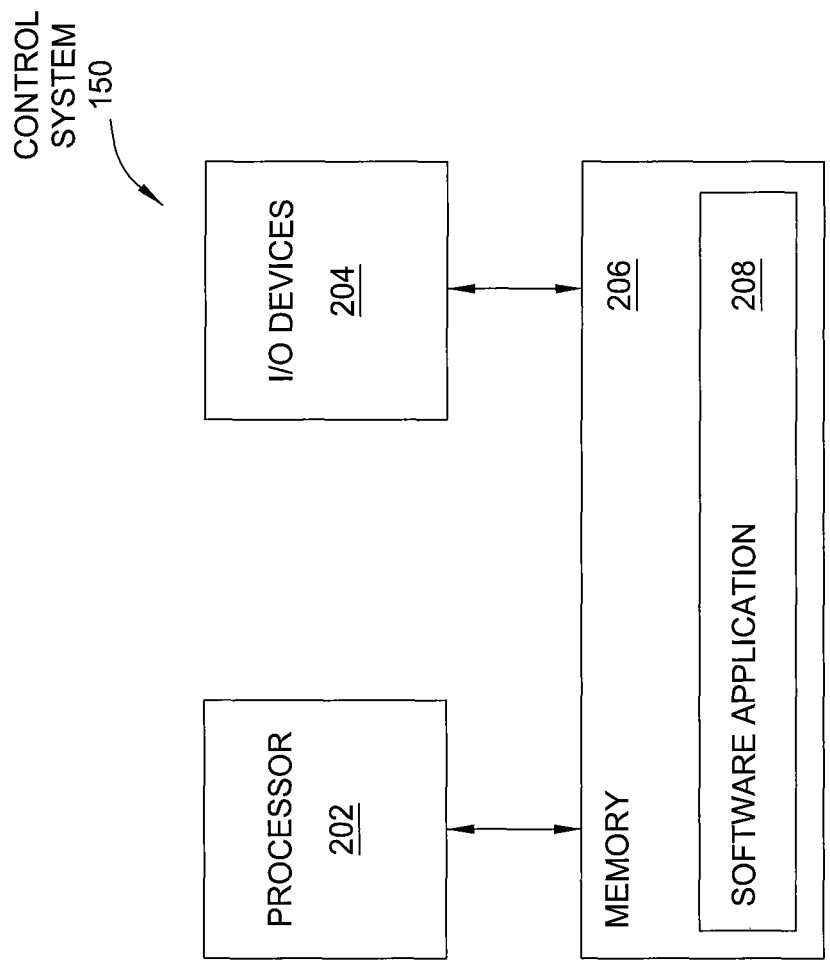
FIG. 2 is a schematic diagram of a control system for the portable display device in FIG. 1, according to some embodiments of the invention.

Control system 150 controls operation of the components of light module 110 and other automated components of portable display device 100, and is illustrated in FIG. 2. FIG. 2 is a schematic diagram of control system 150, according to some embodiments of the invention. As shown, control system 150 includes a processor 202, one or more input/output (I/O) devices 204, and memory 206. Processor 202 can be any technically feasible type of processor, including a central processing unit (CPU), a graphics processing unit (GPU), a field-programmable gate array (FPGA), an integrated circuit (IC), an application-specific integrated circuit (ASIC), or a system-on-a-chip (SOC), among others, and is configured to execute software applications, such as the software application 208. Alternatively, the processor 202 may be a dedicated hardware unit configured to perform specific tasks. I/O device 204 may include any technically feasible devices known in the art including control buttons, an infra-red (IR) receiver, and/or a Bluetooth-enabled transceiver. When I/O device 204 includes a Bluetooth-enabled transceiver, portable display device 100 can be controlled remotely via a smart phone, tablet computer, or other type of Bluetooth-enabled computing device. Memory 206 may be any technically feasible type of memory, including a random access memory (RAM) module, a read-only memory (ROM) module, a hard disk, or a flash disk, among others, and stores therein a software application 208 that contain instructions for controlling the operation of the portable display device 100.

Figure 3:
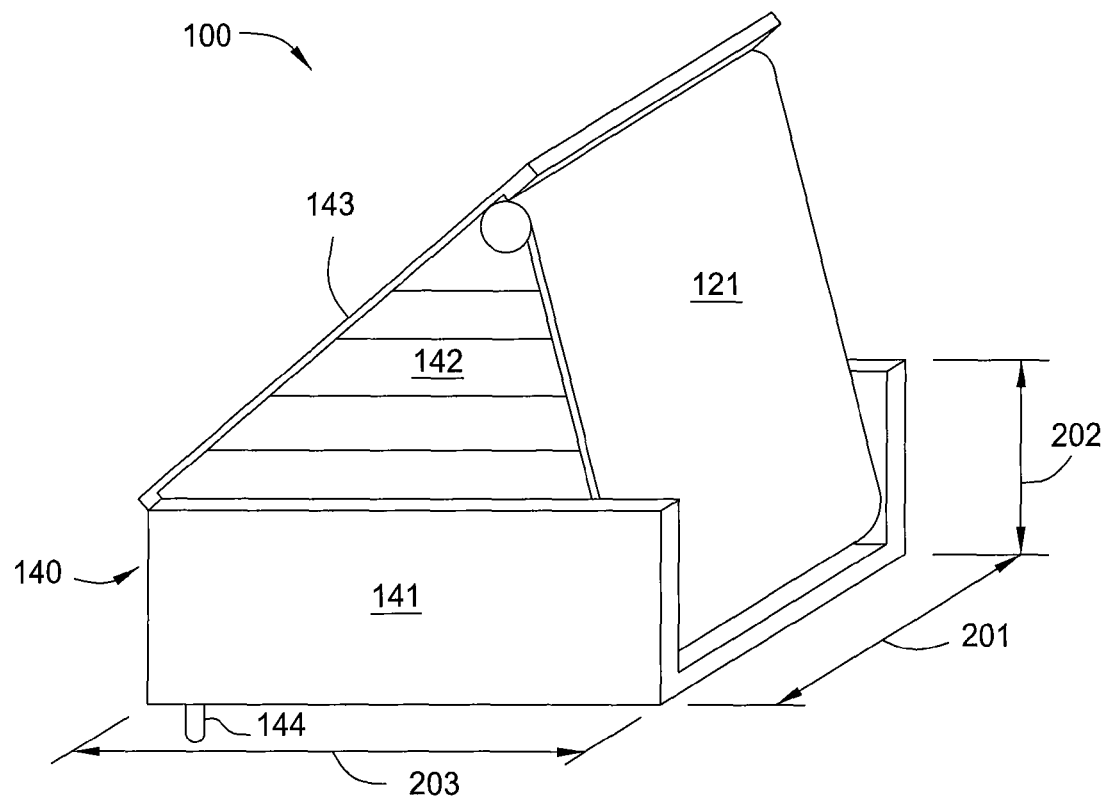
FIG. 3 illustrates a schematic perspective view of a portable display device with a display screen deployed for viewing, according to embodiments of the invention.

FIG. 3 illustrates a schematic perspective view of portable display device 100 with display screen 121 deployed for viewing, according to embodiments of the invention. Top panel 143 is lifted into place as shown either manually, using spring assist, and/or motorized assist, so that top panel 143 supports display screen 121. Battery 130 provides power for light module 110 to generate images on display screen 121 and to power speakers 160. In the embodiment illustrated in FIG. 3, portable display device 100 is substantially triangular in profile and display screen 121 is tilted from the normal when base 141 is resting flush with on a horizontal surface. In such an embodiment, leveling feet 144 can be deployed to adjust the orientation of base 141 to position display screen 121 substantially perpendicular to the horizontal plane when display screen 121 is deployed.

In one embodiment, display screen 121 is a 30" diagonal high-resolution screen having a 1920×1080 pixel format and portable display device 100 is configured to produce images on display screen 121 with a peak brightness of 1000 nits, which can be easily viewed in bright outdoor conditions. In such an embodiment, base 141 has a width 201 of 25 inches, a height 202 of only six inches, and a depth 203 of twelve inches, so that portable display device 100 is very compact when display screen 121 is stowed and top panel 143 is closed. In addition, portable display device is relatively lightweight while still capable of producing images acceptable for outdoor viewing conditions for an extended period. For example, assuming the average power consumption for light module 110 to be 30 W, and battery 130 has a power density of approximately 160 W-H/kg and a weight of 3.8 pounds, portable display device can generate images on display screen 121 with a peak brightness of 500 nits for eight hours. It is noted that in an embodiment in which portable display device 100 has the same configuration of light module 110 and battery 130 described above and display screen 121 is a 25" diagonal screen, portable display device 100 can generate images on display screen 121 for substantially longer than eight hours. A configuration of light module 110 that can generate images on a 30" diagonal display screen using approximately 30 W is described below in conjunction with FIGS. 5-8.

In addition to being compact, portable display device 100 is also lightweight. Specifically, for the embodiment described above having a 30 inch diagonal screen and a 3.8 pound battery, the total weight of portable display device 110 can be less than 20 pounds. In such an embodiment, display screen 121 is estimated to weigh approximately two pounds, each of speakers 160 weigh two pounds, collapsible enclosure assembly 140 is constructed of plastic materials and weighs approximately five pounds, and light module 110 and control system 150 together weigh no more than five pounds.

Figure 4:
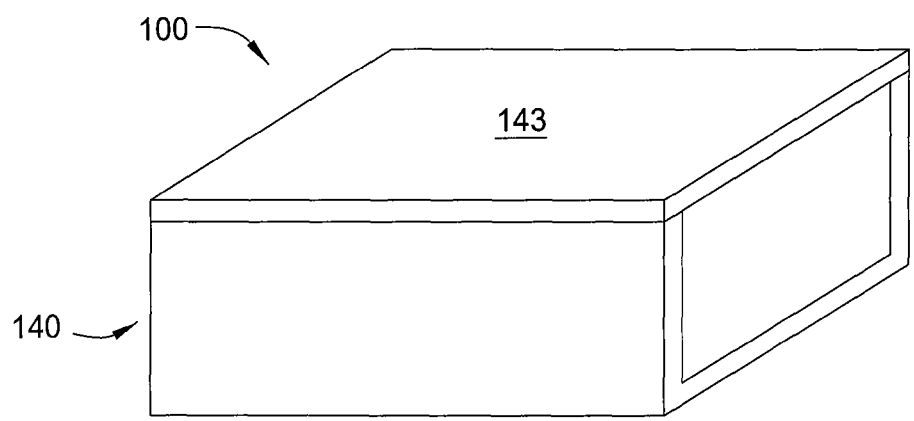
FIG. 4 illustrates a schematic perspective view of a portable display device with a display screen stowed for storage or transport, according to embodiments of the invention.

FIG. 4 illustrates a schematic perspective view of portable display device 100 with display screen 121 stowed for storage or transport, according to embodiments of the invention. As shown, display screen 121 has been disconnected from top panel 143 and stowed in collapsible enclosure assembly 140 by being rolled onto roller mechanism 122 of retractable screen assembly 120, and top panel 143 has been lowered into place to form a compact and lightweight housing.

According to embodiments of the invention, portable display device 100 may be a laser-based display apparatus, such as a video display system or a laser-phosphor display (LPD) system. In such embodiments, display screen 121 includes light-emitting materials or fluorescent materials to emit light under optical excitation from one or more scanning laser beams from light module 110 to produce images on display screen 121. The scanning laser beams are modulated or pulsed to convey information associated with an image to display screen 121. The modulation of the scanning laser beams is controlled in such a way that the scanning laser beam excites the light-emitting materials disposed on display screen 121 to emit red, green and blue colors to produce a desired image. Hence, the scanning laser beams carry the image but do not directly produce the visible light seen by a viewer. Instead, the color light-emitting fluorescent materials on display screen 121 absorb the energy of the scanning laser beams and emit visible light in red, green and blue, or other combinations of colors, to generate the color images seen by the viewer. One of skill in the art will appreciate that such a laser-based display apparatus advantageously requires much less power than LCDs or other displays known in the art. This is because the intensity of source light per pixel is proportional to the intended gray level of said pixel, so that an image-generating beams 111 draws more power for a bright image pixel and less power for a dimmer image pixel. Other technologies know in the art generally have a light source that emits light at full power at all times.

Figure 5:
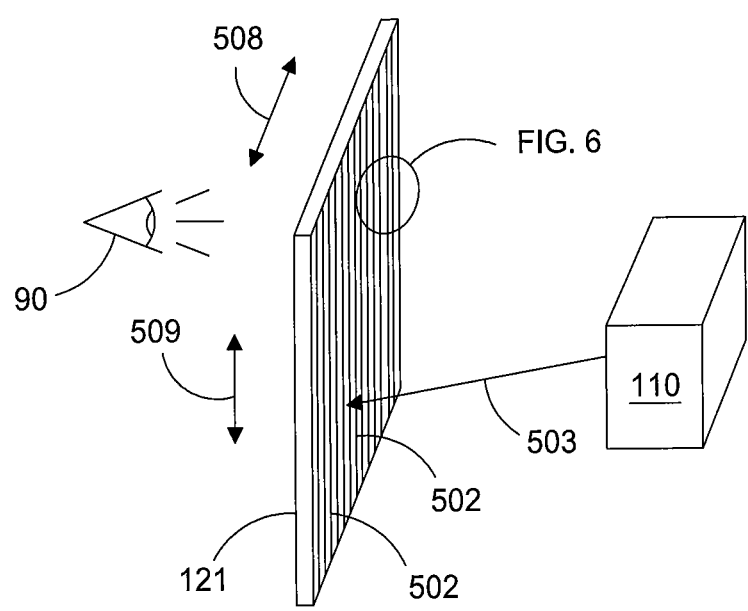
FIG. 5 is a schematic diagram of a light module and a display screen in a portable display device is configured as an LPD display system, according to one embodiment of the invention.

FIG. 5 is a schematic diagram of light module 110 and display screen 121 in portable display device 100 configured as an LPD display system, according to one embodiment of the invention. Display screen 121 includes phosphorescent stripes 502, and light module 110 is configured as a laser module that produces one or more scanning laser beams 503 to excite phosphorescent stripes 502. Phosphorescent stripes 502 are made up of alternating phosphorescent stripes of different colors, e.g., red, green, and blue, where the colors are selected so that they can be combined to form white light and other colors of light. Scanning laser beam 503 is a modulated light beam that is scanned across display screen 121 along two orthogonal directions, e.g., in the horizontal direction 508 and the vertical direction 509, in a raster scanning pattern to produce an image on display screen 121 for viewer 90.

It is noted that phosphorescent-containing materials are but one type of fluorescent material that may be disposed on display screen 121 that are suitable for forming color images. Various embodiments of the invention described herein using phosphors as the fluorescent materials are also applicable to displays with screens including other optically excitable, light-emitting, non-phosphor fluorescent materials. For example, quantum dot materials emit light under proper optical excitation and thus can be used as the fluorescent materials for systems and devices in this application, where semiconductor compounds such as CdSe and PbS, among others, can be fabricated in the form of particles with a diameter on the order of the exciton Bohr radius of the compounds as quantum dot materials to emit light. To produce light of different colors, different quantum dot materials with different energy band gap structures may be used to emit different colors under the same excitation light. Thus, in some embodiments, phosphorescent stripes 502 may include a quantum dot material as a light-emitting material that absorbs optical energy from scanning laser beam 503, rather than a phosphor-containing material.

It is further noted that laser excitation of light-emitting or fluorescent materials on display screen 121 is but one of various forms of optical excitation technique that can impart energy sufficient to cause the fluorescent materials to emit light or to luminesce. In other embodiments, such optical excitation may be generated by a non-laser light source that is sufficiently energetic to excite the fluorescent materials disposed on display screen 121. Examples of non-laser excitation light sources include various light-emitting diodes (LEDs), light lamps and other light sources that produce light at a wavelength or a spectral band to excite a fluorescent material that converts the light of a higher energy into light of lower energy and in the visible range.

Figure 6:
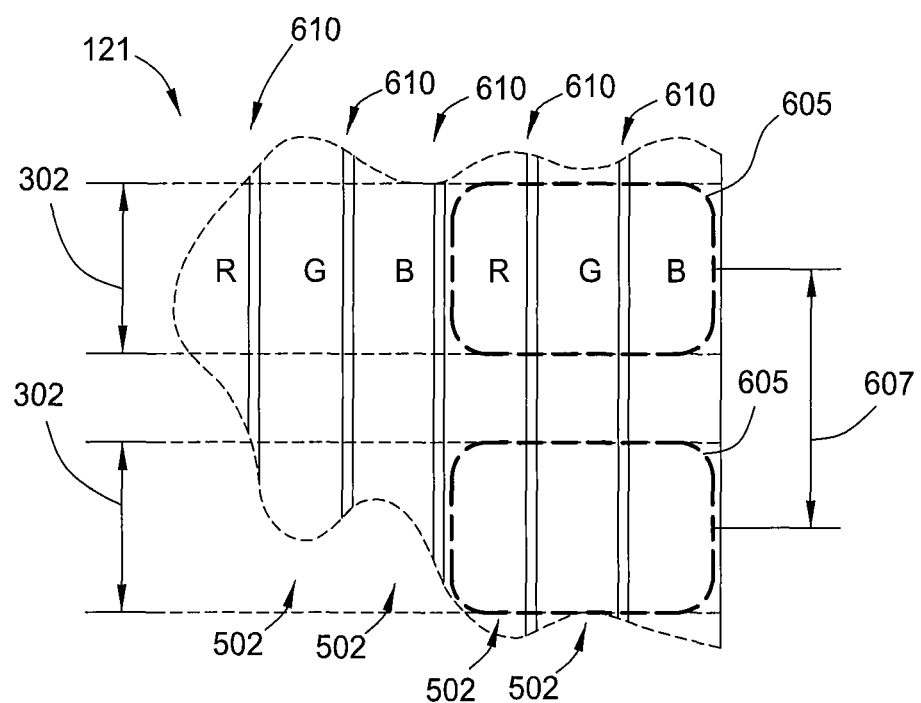
FIG. 6 is a partial schematic diagram of the portion of the display screen indicated in FIG. 5.

FIG. 6 is a partial schematic diagram of the portion of display screen 121 indicated in FIG. 5. FIG. 6 illustrates pixel elements 605, which each include a portion of a red, green, and blue phosphorescent stripe 502. The portions of the phosphorescent stripes 502 within a specific pixel element 605 are referred to herein as "subpixels," where each subpixel is used to emit one of the colors that makes up the pixel element 605. In some embodiments, each phosphorescent stripe 502 is separated from adjacent phosphorescent stripes by a stripe divider 610. The portion of the phosphorescent stripes 502 that belong to a particular pixel element 605 is defined by the laser scanning paths 302, as shown. Light module 110 forms an image on display screen 121 by directing scanning laser beam 503 along the laser scanning paths 302 and modulating scanning laser beam 503 to deliver a desired amount of optical energy to each of the red, green, and/or blue phosphorescent stripes 502 found within each pixel element 605. Each image pixel element 605 outputs light for forming a desired image by the emission of visible light created by the selective laser excitation of each phosphor-containing stripe in a given pixel element 605. Thus, modulation of the red, green, and blue portions of each pixel element 605 controls the composite color and image intensity at each image pixel element location.

In FIG. 6, one dimension of the pixel region is defined by the width of the three phosphorescent stripes 502, and the control of the laser beam spot size defines the orthogonal dimension. In other implementations, both dimensions of image pixel element 605 may be defined by physical boundaries, such as separation of phosphorescent stripes 502 into rectangular phosphor-containing regions or phosphorescent dots. In one embodiment, each of phosphorescent stripes 502 are spaced at about a 300 μm to 600 μm pitch, so that the width of pixel element 605 is on the order of about 1200 μm. Laser scanning paths 302 are separated by a screen pitch 607 of about 200 μm to about 300 μm.

Figure 7:
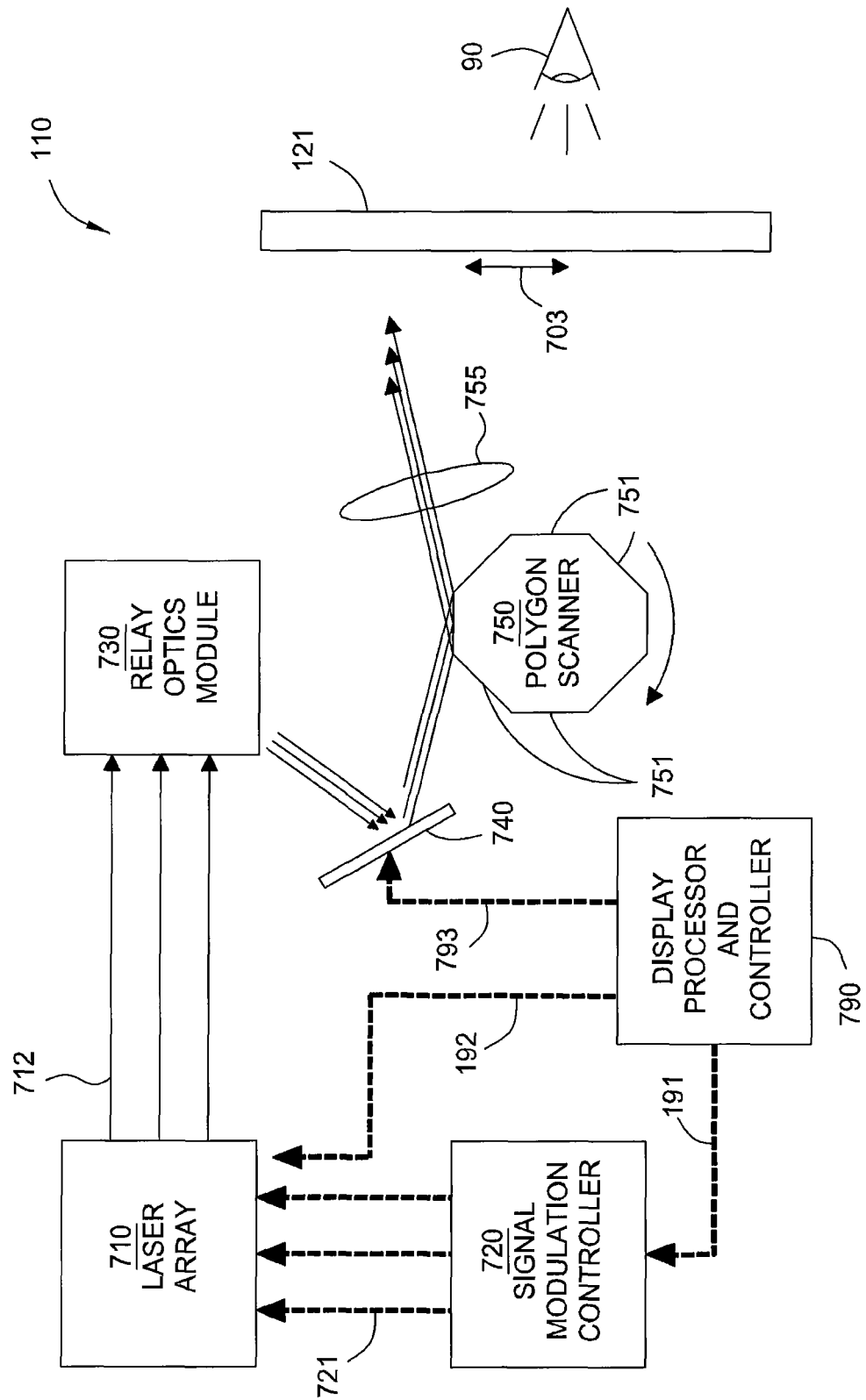
FIG. 7 is a schematic diagram of a light module and a display screen configured according to embodiments of the invention.

FIG. 7 is a schematic diagram of light module 110 and display screen 121 configured according to embodiments of the invention. Light module 110 includes a signal modulation controller 720, a laser array 710, a relay optics module 730, a mirror 740, a polygon scanner 750, an imaging lens 755, and a display processor and controller 790, configured as shown.

Laser array 710 includes multiple lasers, e.g., 5, 10, 20, or more, and generates multiple laser beams 712 to simultaneously scan display screen 121. In one embodiment, the lasers in laser array 710 are ultraviolet (UV) lasers producing light with a wavelength between about 400 nm and 450 nm. Laser beams 712 are modulated light beams that are scanned across display screen 121 along two orthogonal directions, e.g., horizontally and vertically, in a raster scanning pattern to produce an image on display screen 121 for viewer 90.

Signal modulation controller 720 controls and modulates the lasers in laser array 710 so that laser beams 712 are modulated at the appropriate output intensity to produce a desired image on display screen 121. Signal modulation controller 720 may include a digital image processor that generates laser modulation signals 721. Laser modulation signals 721 include the three different color channels and are applied to modulate the lasers in laser array 710.

Together, relay optics module 730, mirror 740, polygon scanner 750, and imaging lens 755 direct laser beams 712 to display screen 121 and scan laser beams 712 horizontally and vertically across display screen 121 in a raster-scanning pattern to produce an image. For the sake of description, "horizontal" with respect to display screen 121 in FIG. 7 is defined as parallel to arrow 703 and "vertical" with respect to fluorescent screen 701 is defined as perpendicular to the plane of the page. Relay optics module 730 is disposed in the optical path of laser beams 712 and is configured to shape laser beams 712 to a desired spot shape and to direct laser beams 712 into a closely spaced bundle of somewhat parallel beams. Mirror 740 is a reflecting optic that can be quickly and precisely rotated to a desired orientation, such as a galvanometer mirror, a microelectromechanical system (MEMS) mirror, etc. Mirror 740 directs laser beams 712 from relay optics module 730 to polygon scanner 750, where the orientation of mirror 740 partly determines the vertical positioning of laser beams 712 on display screen 121. Polygon scanner 750 is a rotating, multi-faceted optical element having a plurality of reflective surfaces 751, e.g., 5 to 10, and directs laser beams 712 through imaging lens 755 to display screen 121. The rotation of polygon scanner 750 sweeps laser beams 712 horizontally across the surface of display screen 121 and further defines the vertical positioning of laser beams 712 on display screen 121. Imaging lens 755 is designed to direct each of laser beams 712 onto the closely spaced pixel elements 205 on display screen 121.

In operation, the positioning of mirror 740 and the rotation of polygon scanner 750 horizontally and vertically scan laser beams 712 across display screen 121 so that all of pixel elements 605 are illuminated as desired. To wit, as polygon scanner 750 rotates one of reflective surfaces 751 through incident laser beams 712, each of laser beams 712 is directed to sweep horizontally across display screen 121 from one side to the other, each laser beam following a different vertically displaced laser scanning path 302, thereby illuminating the pixel elements 605 disposed in these laser scanning paths 302 (laser scanning paths 302 and pixel elements 605 are illustrated in FIG. 6). Given N lasers in laser array 710 and N laser beams 712, a "swath" consisting of N laser scanning paths 204 is illuminated as polygon scanner 750 rotates one of reflective surfaces 751 through incident laser beams 712. Because each of reflective surfaces 751 is canted at a different angle with respect to the horizontal, i.e., the plane of the page, when polygon scanner 750 rotates a subsequent reflective surface 751 through incident laser beams 712, the beams sweep horizontally across display screen 121 at a different vertical location. Thus, given N laser beams and M reflective surfaces 751 of polygon scanner 750, one rotation of polygon scanner 750 "paints" M×N rows of pixels. If display screen 121 is made up of more than M×N horizontal rows of pixels, then mirror 740 can be repositioned so that another block of M×N horizontal rows of pixels will be painted during the next rotation of polygon scanner 750. Once all pixels of display screen 121 have been illuminated, mirror 740 returns to an initial or top position and the cycle is repeated in synchronization with the refresh rate of the display.

In one embodiment, laser array 710 includes 34 lasers and polygon scanner 750 is an eight-facet polygon, thereby producing 272 horizontal lines on display screen 121 in a single rotation of polygon scanner 750. Using two positions of mirror 740 to paint display screen 121 twice with laser beams 712 then produces 544 horizontal lines on display screen 121, which is equivalent to a high-definition display. For a higher definition display, more rotations of polygon scanner 750 may be used. It is noted that the lasers in laser array 710 may have an optical power output of as little as 1 to 2 W and still generate images having an average peak brightness of 500 nits or more on a 30 inch diagonal high-definition screen. Thus, with an average power output of approximately 30 or 40 W, portable display device 100 can produce images that are viewable in an outdoor environment.

Because the phosphorescent stripes 502 are spaced at relatively narrow pitch, e.g., on the order of 300 µm-600 µm, precise alignment of light module 110 with respect to display screen 121 during operation of portable display device 100 is highly desirable. Misalignment of the lasers in laser array 710 by as little as 600 µm to 1200 µm or less can cause laser beams 712 to illuminate a different phosphorescent stripe 502 than the intended target phosphorescent stripe while being scanned across display screen 101, thereby resulting in significant image quality problems, including changes in color and brightness. Considering that display screen 121 and light module 110 are not permanently fixed in position with respect to each other, and portable display device 100 is configured to be, repeatedly deployed from a compact and lightweight collapsible assembly, such precise alignment is difficult to achieve. In order to ensure such highly accurate alignment, in some embodiments portable display device 100 includes servo control mechanisms based on a designated servo beam that is scanned over the screen by the same optical scanning components that scan laser beams 712 across display screen 121. This designated servo beam is used to provide servo feedback control over the scanning excitation beams, i.e., laser beams 712, to ensure proper optical alignment and accurate delivery of optical pulses during operation of portable display device 100. In some embodiments, the servo beam is at a different wavelength of light than laser beams 712, e.g., the servo beam may be an infra-red (IR) beam, and display screen 121 is configured to reflect the servo beam to produce servo feedback light. In other embodiments, laser beams 712 can be used to produce servo feedback light in addition to or in lieu of a dedicated IR servo beam. In such embodiments, an image can be generated on display screen 121 that is centered vertically and horizontally without adjustments or other intervention on the part of a user.

Figure 8:
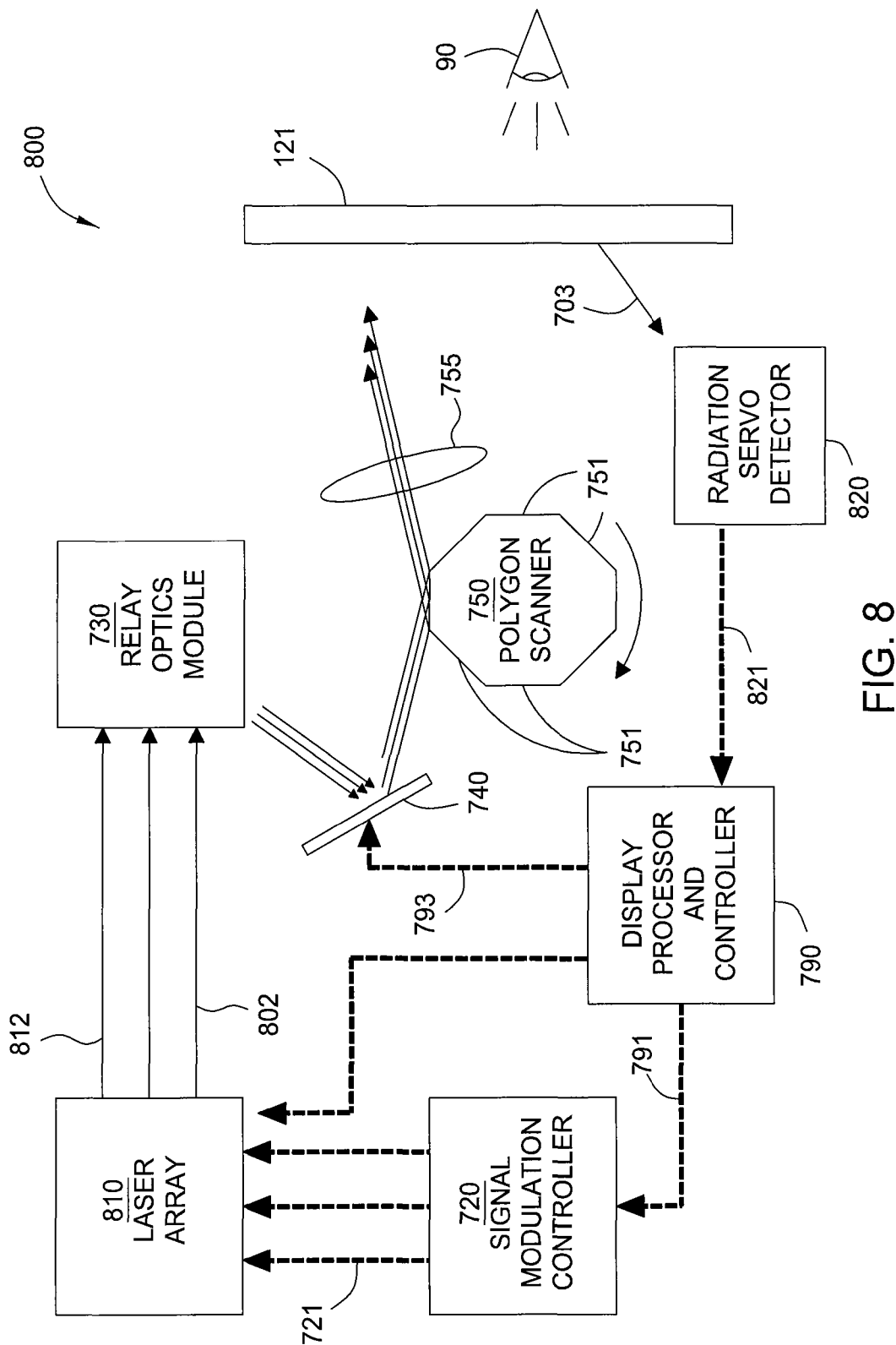
FIG. 8 is a schematic diagram of a light module configured with a servo beam, according to embodiments of the invention.

FIG. 8 is a schematic diagram of a light module 800 configured with a servo beam, according to embodiments of the invention. Light module 800 is a laser module substantially similar to laser module 110 in organization and operation, with the following exceptions. Laser array 810 includes, in addition to laser array 710 described above in conjunction with FIG. 7, a laser diode for generating a servo beam 802. Laser beams 812 include laser beams 112 for exciting phosphors and servo beam 802 to provide servo feedback control over laser beams 112. Display screen 121 includes reflective servo reference marks disposed on display screen 121, and these reflective servo reference marks reflect servo beam 802 away from display screen 121 as servo feedback light 832. Light module 800 also includes one or more radiation servo detectors 820, which detect servo feedback light 832 and direct servo detection signals 821 to display processor and controller 790 for processing. The servo reference marks may be located between phosphorescent stripes 502 in the active display area of display screen 121, in an off-screen calibration module, or both. In some embodiments, one servo lock system is utilized in portable system 100 to maintain proper alignment of laser beams 812 vertically and a different servo lock system is utilized to maintain proper alignment of laser beams 812 horizontally.

Figure 9:
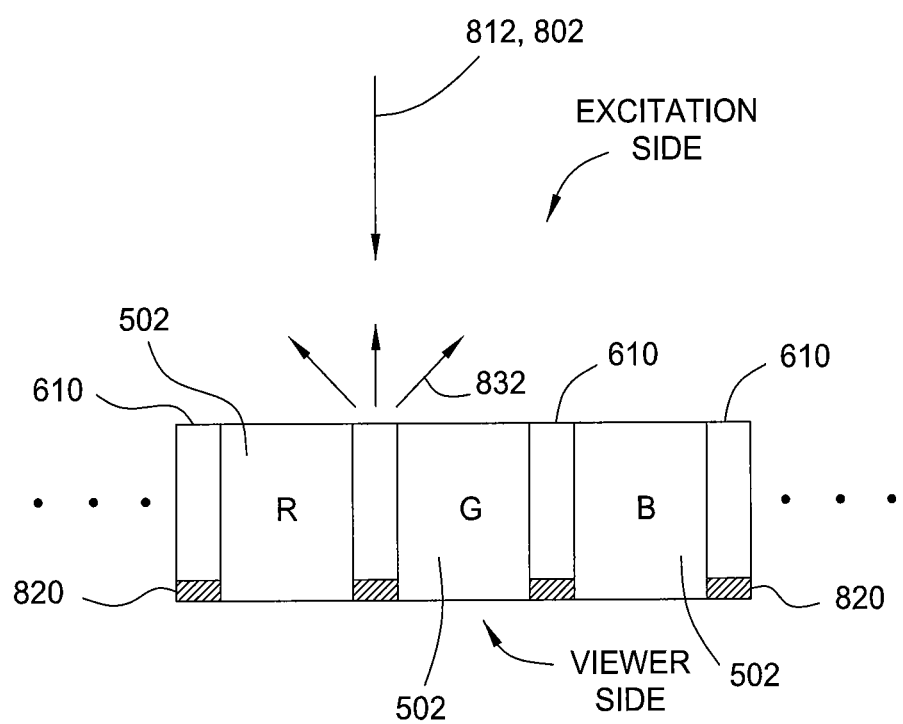
FIG. 9 schematically illustrates a display screen configured to provide a servo feedback light, where the servo feedback light can include reflected light from a servo beam and/or reflected light from laser beams.

In some embodiments, servo feedback light 832 is used to align laser beams 812 horizontally with respect to display screen 121, i.e., laser beams 812 are each aligned with the proper phosphorescent stripe 502. FIG. 9 schematically illustrates display screen 121 configured to provide servo feedback light 832, where servo feedback light 832 can include reflected light from servo beam 802 and/or reflected light from laser beams 812. Display screen 121 includes stripe dividers 610 that are disposed between phosphorescent stripes 502 and made optically reflective to the servo and excitation beams so that the reflection can be used as feedback light 832. The stripe divider 610 can also be made reflective and opaque to incident light to optically isolate adjacent phosphorescent stripes 502 to enhance contrast and to reduce cross talk there between. Phosphorescent stripes 502 are less reflective to servo beam 802 and laser beams 812 than stripe dividers 610 so that servo feedback light 832 exhibits a spike in intensity each time servo beam 802 and/or laser beams 812 are scanned across a stripe divider 610. An absorbent black layer 820 may be coated on each stripe divider 610 on the viewer side of display screen 121 to reduce glare of ambient light to viewer.

Figure 10:
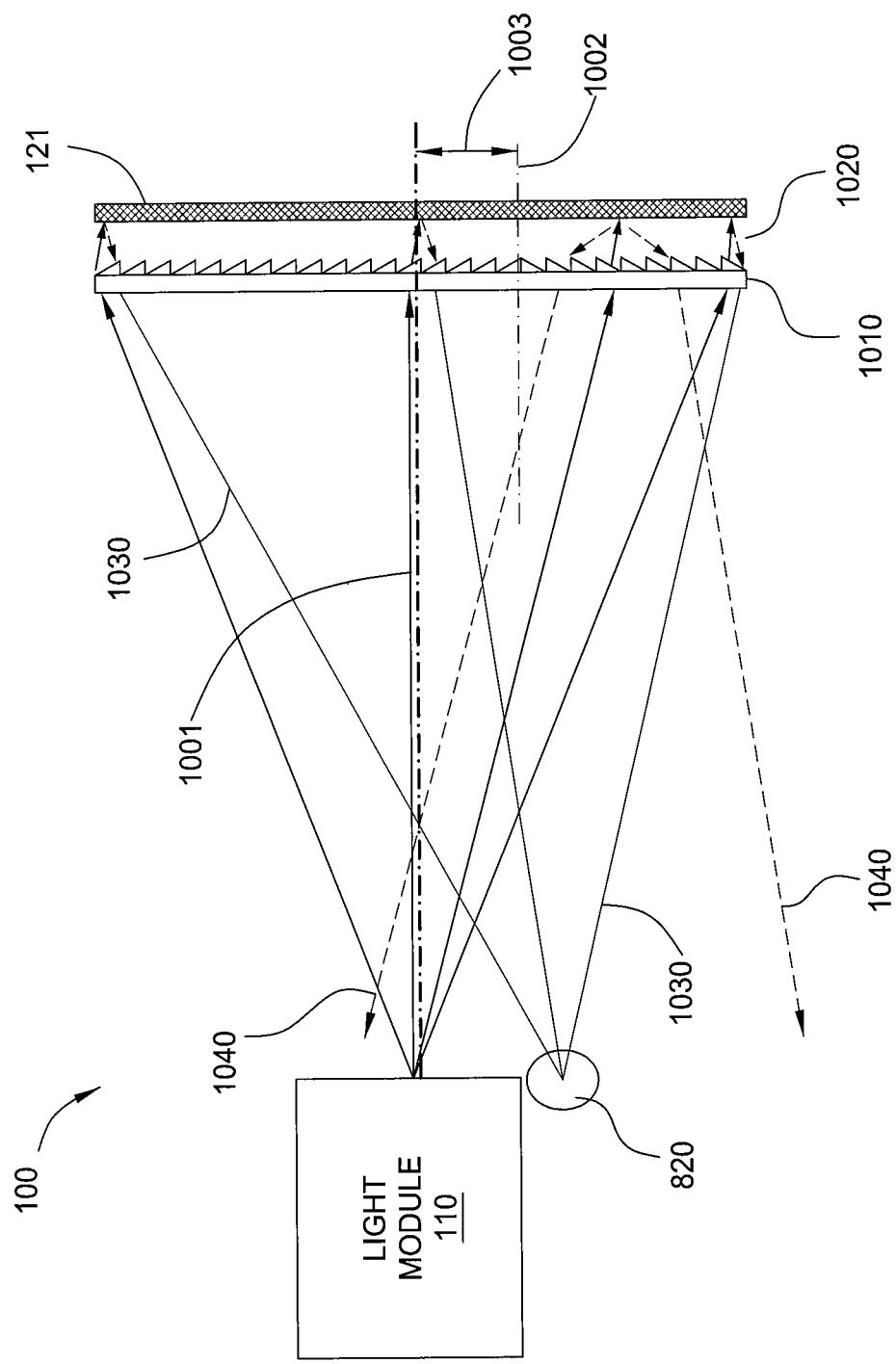
FIG. 10 schematically illustrates a configuration of a display screen that facilitates the detection of a servo feedback light based on the specularly reflective surfaces of stripe dividers and the optically diffusive surfaces of phosphorescent stripes, according to an embodiment of the invention.

In each horizontal scan of servo beam 802 and laser beams 812 across phosphorescent stripes 502 the reflections produced by stripe dividers 610 can be used to indicate horizontal positions of the stripe dividers 610, spacing between two adjacent stripe dividers 610, and horizontal positions servo beam 802 and laser beams 812 with respect to display screen 121. Therefore, reflections from stripe dividers 610 can be used for servo control of the horizontal alignment between laser beams 812 and phosphorescent stripes 502. In some embodiments, stripe dividers 610 have a specularly reflective surface and phosphorescent stripes 502 have an optically diffusive surface, in order to enhance the detectability of servo feedback light 832. In such embodiments, stripe dividers 610 have a smooth surface on the excitation side of display screen 121 to produce a specular reflection of incident IR, such as incident servo beam 802. In contrast, phosphorescent stripes 502 have a roughened surface that diffuses reflected IR light, and therefore produces diffused reflections that spread in different directions to form a diffused reflection cone. Such a diffused reflection cone is illustrated in FIG. 10. It is noted that the two specularly reflective and optically diffusive surfaces on the excitation side of display screen 121 have approximately the same optical transmission for light at the wavelength of laser beams 812.

FIG. 10 schematically illustrates a configuration of display screen 121 that facilitates the detection of servo feedback light 832 based on the specularly reflective surfaces of stripe dividers 610 and the optically diffusive surfaces of phosphorescent stripes 502, according to an embodiment of the invention. Laser module 110 projects and scans both servo beam 802 and laser beams 812 onto display screen 121 with stripe dividers 610 acting as specularly reflective IR feedback marks. Laser module 110 has a symmetric optic axis 1001 around which the beam scanning is performed, and a Fresnel lens layer 1010 and an air gap 1020 are disposed adjacent display screen 121, as shown. Fresnel lens layer 1010 is an optical telecentric lens that may be configured as a layer incorporated within the structure of display screen 121. Because a Fresnel lens is formed from a relatively thin layer of material, Fresnel lens layer 1010 can readily be incorporated into the display screen 121 as an additional layer without significantly decreasing the flexibility of display screen 121. Fresnel lens layer 1010 is configured to couple servo beam 802 and laser beams 812 onto display screen 121 with substantially normal incidence to display screen 121. Fresnel lens layer 1010 is configured with its symmetric optic axis 1002 oriented parallel to symmetric optic axis 1001 of laser module 110 and with an offset 1003 therebetween as shown.

Fresnel lens layer 1010 is optically positioned between laser module 110 and the phosphorescent stripes of display screen 121 to direct servo feedback light 832 to radiation servo detector 820. Specifically, symmetric optic axis 1002 of Fresnel lens layer 1010 is oriented parallel to and offset from symmetric optic axis 1001 of laser module 110. In this way, light from servo beam 802 is specularly reflected when incident on stripe dividers 610 and is directed by Fresnel lens layer 1010 to radiation servo detector 820, while light from servo beam 802 is diffusely reflected when incident on phosphorescent stripes 502 and is spread by Fresnel lens layer 1010 over relatively large area so that only a very small fraction of the diffusely reflected light from servo beam 802 is received by radiation servo detector 820. Consequently, servo detection signals 821 from radiation servo detector 820 can be used to determine a hit by servo beam 802 on a stripe divider 610 configured as a servo reference mark.

In some embodiments, the light of laser beams 812 can also be reflected back by the specular and diffusive regions on display screen 121. Hence, the specularly reflected light at the excitation wavelength is also directed back to radiation servo detector 820. A wavelength selective optical beam splitter can be used to split the collected light at the servo wavelength and the collected light at the excitation wavelength into two separate signals for separate optical detectors, where radiation servo detector 820 receives the IR servo light and another servo detector receives the feedback light at the excitation wavelength.

In some embodiments, servo feedback light 832 is used to align laser beams 812 vertically with respect to display screen 121 and with respect to each other. In some embodiments, peripheral servo reference marks are positioned outside the active display area of display screen 121, such as in an off-screen calibration module, and are used to produce feedback light 832 in FIG. 8. In such embodiments, the servo reference marks may include scribe lines that, when traversed by servo beam 802 and/or laser beams 812, produce servo feedback light 832 that allows controller 150 of portable display device 100 to determine the vertical position of servo beam 802 and/or laser beams 812.

Figure 11:
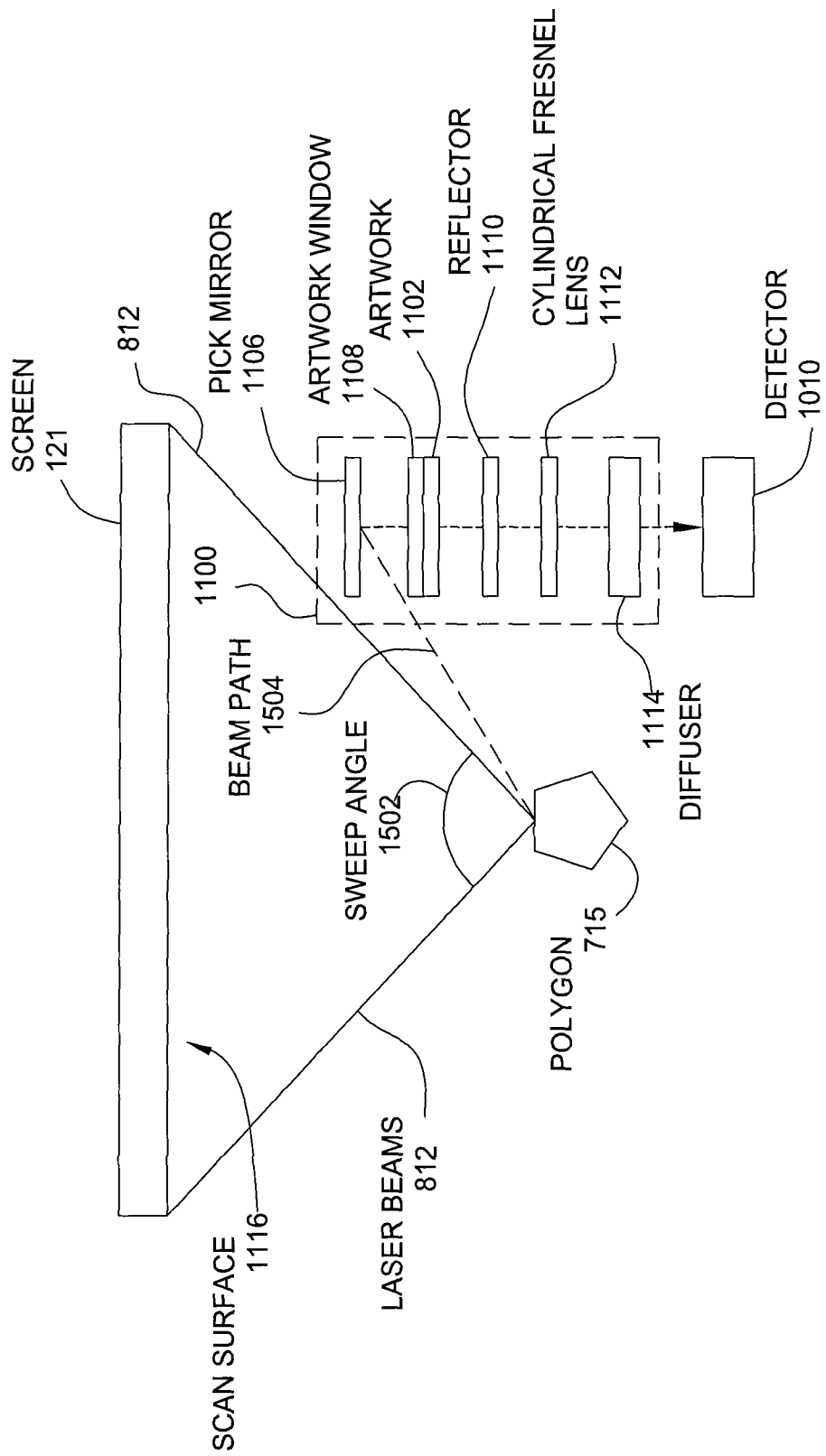
FIG. 11 schematically illustrates a display screen configured with an off-screen calibration module to determine the vertical position of a servo beam and/or laser beams, according to an embodiment of the invention.

FIG. 11 schematically illustrates display screen 121 configured with an off-screen calibration module 1100 to determine the vertical position of servo beam 802 and/or laser beams 812, according to an embodiment of the invention. Off-screen calibration module 1100 is disposed outside of the active display area of display screen 121 and includes artwork 1102 and optical components for directing servo feedback light 832 to a detector 1010. The term "artwork" is used herein to describe a surface having lines and marks drawn thereon to enable calibration. Artwork 1102 may include a pair of vertical scribe lines and a set of scribes that are transmissive to servo beam 802 and/or laser beams 812. The optical components of off-screen calibration module 1100 include a pick mirror 1106, an artwork window 1108, a reflector 1110, a cylindrical Fresnel lens 1112, and a diffuser 1114. Pick mirror 1106 reflects incident light beams through artwork window 1108 to artwork 1102. Reflector 1110 reflects the transmitted portion of incident laser beams to cylindrical Fresnel lens 1112, which directs the reflected laser beams to diffuser 1114. Detector 1010 then detects the diffuse laser beams. Scribes included in artwork 1102 have geometries that transmit different amounts of incident light depending on the vertical position at which the incident light traverses the scribes. For example, the scribes included in artwork 1102 may be diamond-shaped, triangular, etc. Thus, the servo feedback light 832 detected by detector 1010 varies in brightness depending on the vertical position of the incident light beam being measured, and controller 150 can determine the vertical position of a desired light beam. Controller 150 can then adjust mirror 740 accordingly to precisely position laser beams 812 as desired with respect to display screen 121.

Additional examples of an LPD-based display system configured with a servo beam that allows fine-tuning of the position of scanning laser beams on a display screen are described in greater detail in U.S. Patent Application Publication No. 2010/0097678, entitled "Servo Feedback Control Based on Designated Scanning Servo Beam in Scanning Beam Display Systems with Light-Emitting Screens" and filed Dec. 21, 2009.

In sum, embodiments of the invention set forth a portable display apparatus for displaying high-resolution still and video images suitable for viewing in outdoor conditions. One advantage of the present invention includes a truly portable, high-definition display device that can operate for extended periods without an external power source—even when displaying images having high average brightness. In addition, embodiments of the present invention provide a compact and easily setup display device that does not need calibration or other alignment procedures to be performed by a user.

While the foregoing is directed to embodiments of the present invention, other and further embodiments of the invention may be devised without departing from the basic scope thereof, and the scope thereof is determined by the claims that follow.

I claim:

1. An electronic display device, comprising:
 a light module;
 a rollable screen that includes a plurality of pixels, each pixel comprising one or more fluorescent materials configured to emit visible light when excited by pulsed excitation radiation generated by the light module, wherein the excitation radiation originates from outside the screen;
 reference marks disposed on an excitation side of the rollable screen and configured to reflect a servo beam away from the rollable screen as servo feedback light;
 wherein the electronic display device includes one or more radiation servo beam detectors, which detect the reflected servo beam and direct servo detection signals to a display processor for processing;
 wherein the one or more radiation servo beam detectors are proximate to the light module; and
 wherein the rollable screen also has a viewer side with a viewing surface for viewing by a viewer opposite the excitation side, and wherein the viewer side and the excitation side are separated by the plurality of pixels.

2. The electronic display device of claim 1, further comprising a roller mechanism mechanically coupled to an edge of the rollable screen and configured as a stowing mechanism for the rollable screen.

3. The electronic display device of claim 2, wherein the roller mechanism is further configured to deploy the rollable screen as a substantially planar viewing surface.

4. The electronic display device of claim 1, wherein the excitation radiation comprises ultra-violet light.

5. The electronic display device of claim 1, wherein the excitation radiation comprises light emitted by a light source selected from the group consisting of a visible laser, an ultra-violet laser, and a light-emitting diode.

6. The electronic display device of claim 1, wherein each pixel element comprises a first subpixel and a second subpixel, the first subpixel comprising one of the one or more fluorescent materials and the second subpixel being configured to emit light having a visible frequency when illuminated by excitation radiation having the visible frequency.

7. The electronic display device of claim 1, wherein each pixel element comprises multiple subpixels and each of the one or more fluorescent materials comprises a phosphorescent stripe that corresponds to one of the subpixels of the pixel element.

8. The electronic display device of claim 1, wherein at least one of the one or more fluorescent materials comprises a quantum dot material.

9. The device of claim 1, wherein the light module is a raster scan imager.

10. The device of claim 1, wherein the light module centers the image within the plurality of pixels, when the rollable screen is unrolled.

11. The device of claim 1, wherein the light module further comprises modulating lasers.

12. An electronic display device, comprising:
a light module;
a rollable screen that includes a plurality of pixels, each pixel comprising one or more subpixels that are each configured to emit light having a visible frequency when illuminated by pulsed excitation radiation;
a roller mechanism mechanically coupled to an edge of the rollable screen and configured as a stowing mechanism for the rollable screen;
reference marks disposed on an excitation side of the rollable screen and configured to reflect a servo beam away from the rollable screen as servo feedback light;
wherein the electronic display device includes one or more radiation servo beam detectors which detect the reflected servo beam and direct servo detection signals to a display processor for processing;
wherein the one or more radiation servo beam detectors are proximate to the light module; and
wherein the rollable screen also has a viewer side with a viewing surface for viewing by a viewer opposite the excitation side, and wherein the viewer side and the excitation side are separated by the plurality of pixels.

13. The device of claim 12, wherein the light module is a raster scan imager.

14. The device of claim 12, wherein the light module centers the image within the plurality of pixels, when the rollable screen is unrolled.

15. The device of claim 12, wherein the light module further comprises modulating lasers.

16. An electronic display device, comprising:
an imaging surface comprising a rollable screen;
a light source configured to generate at least one pulsed light beam for illuminating a portion of the imaging surface;
an optical assembly configured to direct the at least one light beam to the imaging surface;
a plurality of pixels disposed on the rollable screen, each pixel comprising one or more subpixels that are each configured to emit light having a visible frequency when illuminated by pulsed excitation radiation that originates from outside the screen;
reference marks disposed on an excitation side of the rollable screen and configured to reflect a servo beam away from the rollable screen as servo feedback light;
wherein the electronic display device includes one or more radiation servo beam detectors which detect the reflected servo beam and direct servo detection signals to a display processor for processing;
wherein the one or more radiation servo beam detectors are proximate to the light module; and
wherein the rollable screen also has a viewer side with a viewing surface for viewing by a viewer opposite the excitation side, and wherein the viewer side and the excitation side are separated by the plurality of pixels.

17. The device of claim 16, further comprising a roller mechanism mechanically coupled to an edge of the rollable screen and configured as a stowing mechanism for the rollable screen.

18. The device of claim 16, wherein the light module is a raster scan imager.

19. The device of claim 16, wherein the light module centers the image within the plurality of pixels, when the rollable screen is unrolled.

* * * * *